US008777103B2

(12) United States Patent
Doglioni Majer

(10) Patent No.: US 8,777,103 B2
(45) Date of Patent: Jul. 15, 2014

(54) AUTOMATIC DISPENSING MACHINE AND METHOD OF OPERATION

(75) Inventor: Luca Doglioni Majer, Carate Urio (IT)

(73) Assignee: Tuttoespresso S.R.L., Origgio (IT)

( * ) Notice: Subject to any disclaimer, the term of this patent is extended or adjusted under 35 U.S.C. 154(b) by 0 days.

(21) Appl. No.: 13/483,925

(22) Filed: May 30, 2012

(65) Prior Publication Data

US 2012/0239187 A1 Sep. 20, 2012

Related U.S. Application Data

(63) Continuation of application No. 12/671,084, filed as application No. PCT/IB2008/002010 on Aug. 1, 2008, now Pat. No. 8,201,736.

(30) Foreign Application Priority Data

Aug. 1, 2007 (EP) .................................... 07015097

(51) Int. Cl.

| | |
|---|---|
| ***G06K 15/00*** | (2006.01) |
| ***G07B 15/02*** | (2011.01) |
| ***G06F 19/00*** | (2011.01) |
| ***G06F 7/00*** | (2006.01) |
| ***G06F 9/00*** | (2006.01) |
| ***G06F 17/00*** | (2006.01) |

(52) U.S. Cl.
USPC ............... 235/383; 235/381; 235/385; 221/9; 221/10; 221/52; 194/216; 700/231; 700/232; 700/233

(58) Field of Classification Search
USPC .................. 235/383, 381, 385; 221/9, 10, 52; 194/216; 700/232, 233, 231; 705/21, 705/22
See application file for complete search history.

(56) References Cited

U.S. PATENT DOCUMENTS 4,245,730 A * 1/1981 Bachmann et al. ........... 194/350
RE31,162 E * 3/1983 Bachmann et al. ........... 194/350
(Continued)

FOREIGN PATENT DOCUMENTS

EP 0823696 2/1998
EP 823696 A2 * 2/1998 ................ G07F 9/02
(Continued)

OTHER PUBLICATIONS

International Search Report issued Apr. 14, 2009 in International Application No. PCT/IB2008/002010 filed Aug. 1, 2008.

*Primary Examiner* — Daniel Walsh
(74) *Attorney, Agent, or Firm* — Oblon, Spivak, McClelland, Maier & Neustadt, L.L.P.

(57) ABSTRACT

A dispensing machine, and related operating method, includes a device for dispensing packaged and/or unpackaged edible goods or beverages, a control unit connected to one or more electrically-activated parts of the machine, a user interface to show information to the user and retrieve input commands from the user to be sent to the control unit. The user interface is a graphic user interface GUI comprising a touch-panel integrated in a graphic screen to display multimedia content. The content or form of the information shown on the screen is changed by the control unit based on at least one parameter related to any of the operative status of the machine, the location wherein the machine is running, the calendar date and/or the daily time, statistics indicative of previous selections made by user(s), or the signal provided by at least one sensor of the machine detecting proximity of the user(s).

22 Claims, 8 Drawing Sheets

(56) References Cited

U.S. PATENT DOCUMENTS

| | | | | | |
|---|---|---|---|---|---|
| 4,682,709 | A * | 7/1987 | Brandes et al. | 221/2 |
| 4,730,750 | A * | 3/1988 | Ficken | 221/124 |
| 4,954,697 | A * | 9/1990 | Kokubun et al. | 235/381 |
| 5,265,518 | A * | 11/1993 | Reese et al. | 99/280 |
| 5,564,007 | A * | 10/1996 | Kazen-Goudarzi et al. | 715/763 |
| 5,607,211 | A * | 3/1997 | Henninger et al. | 312/204 |
| 5,831,862 | A * | 11/1998 | Hetrick et al. | 700/232 |
| 5,848,726 | A * | 12/1998 | Yajima et al. | 221/150 HC |
| 5,959,869 | A | 9/1999 | Miller et al. | |
| 6,075,214 | A * | 6/2000 | Sato et al. | 200/314 |
| 6,286,710 | B1 * | 9/2001 | Paek | 221/8 |
| 6,330,958 | B1 * | 12/2001 | Ruskin et al. | 221/75 |
| 6,759,072 | B1 * | 7/2004 | Gutwein et al. | 426/433 |
| 7,161,494 | B2 * | 1/2007 | Akuzawa | 340/815.4 |
| 7,286,112 | B2 * | 10/2007 | Kinjo | 345/156 |
| 7,783,381 | B2 * | 8/2010 | Walker et al. | 700/240 |
| 8,032,251 | B2 * | 10/2011 | Monn | 700/233 |
| 8,201,736 | B2 * | 6/2012 | Doglioni Majer | 235/383 |
| 8,233,186 | B2 * | 7/2012 | Sakura et al. | 358/1.2 |
| 2002/0087413 | A1 * | 7/2002 | Mahaffy et al. | 705/16 |
| 2003/0030539 | A1 * | 2/2003 | McGarry et al. | 340/5.9 |
| 2003/0142082 | A1 * | 7/2003 | Spalding | 345/175 |
| 2003/0177348 | A1 * | 9/2003 | Davies et al. | 713/153 |
| 2003/0232640 | A1 * | 12/2003 | Walker et al. | 463/16 |
| 2004/0162633 | A1 | 8/2004 | Kraft et al. | |
| 2005/0038559 | A1 * | 2/2005 | Ghidotti | 700/239 |
| 2005/0080679 | A1 * | 4/2005 | Barton et al. | 705/16 |
| 2005/0107912 | A1 * | 5/2005 | Martin et al. | 700/232 |
| 2005/0154644 | A1 | 7/2005 | Deakin et al. | |
| 2005/0234590 | A1 * | 10/2005 | Sato et al. | 700/231 |
| 2005/0261802 | A1 * | 11/2005 | Akuzawa et al. | 700/232 |
| 2005/0263007 | A1 * | 12/2005 | Akuzawa et al. | 99/279 |
| 2006/0096997 | A1 * | 5/2006 | Yeo | 221/9 |
| 2006/0102645 | A1 * | 5/2006 | Walker et al. | 221/75 |
| 2006/0164387 | A1 * | 7/2006 | Takisima | 345/156 |
| 2006/0282323 | A1 * | 12/2006 | Walker et al. | 705/14 |
| 2006/0283958 | A1 * | 12/2006 | Osterweil | 235/492 |
| 2007/0018972 | A1 | 1/2007 | Wampler | |
| 2007/0241120 | A1 * | 10/2007 | Henry | 221/2 |
| 2008/0006649 | A1 * | 1/2008 | Masters et al. | 221/154 |
| 2008/0116262 | A1 | 5/2008 | Majer | |
| 2008/0182644 | A1 * | 7/2008 | Lutnick et al. | 463/20 |
| 2008/0183330 | A1 * | 7/2008 | Monn | 700/239 |
| 2008/0307329 | A1 * | 12/2008 | Endoh | 715/762 |
| 2009/0120761 | A1 * | 5/2009 | Bashor et al. | 194/350 |
| 2009/0177318 | A1 * | 7/2009 | Sizemore | 700/236 |
| 2010/0138037 | A1 * | 6/2010 | Adelberg et al. | 700/241 |
| 2010/0191369 | A1 | 7/2010 | Kim | |
| 2010/0193537 | A1 * | 8/2010 | Doglioni Majer | 221/1 |
| 2010/0262540 | A1 | 10/2010 | Shin et al. | |
| 2010/0268792 | A1 * | 10/2010 | Butler et al. | 709/217 |
| 2011/0107209 | A1 * | 5/2011 | Ha et al. | 715/702 |
| 2011/0134075 | A1 * | 6/2011 | Takusa | 345/174 |
| 2011/0186627 | A1 * | 8/2011 | Kreamer | 235/379 |
| 2011/0295417 | A1 * | 12/2011 | Smith et al. | 700/235 |

FOREIGN PATENT DOCUMENTS

| | | | | |
|---|---|---|---|---|
| EP | 1555639 | | 7/2005 | |
| EP | 1555639 | A2 * | 7/2005 | G07F 9/02 |
| GB | 2289971 | | 12/1995 | |
| JP | 10-198853 | | 7/1998 | |
| JP | 11-039542 | | 2/1999 | |
| JP | 2001-283317 | | 10/2001 | |
| JP | 2003281604 | A * | 10/2003 | G07D 9/00 |
| JP | 2004-164405 | | 6/2004 | |
| JP | 2006-209550 | | 8/2006 | |
| WO | 9816892 | | 4/1998 | |
| WO | 9930291 | | 6/1999 | |
| WO | 01/03087 | | 1/2001 | |
| WO | 2004/036509 | | 4/2004 | |
| WO | 2005/091233 | | 9/2005 | |
| WO | 2006/016241 | | 2/2006 | |
| WO | 2006/021825 | | 3/2006 | |
| WO | 2007/003990 | | 1/2007 | |
| WO | 2007012949 | | 2/2007 | |

* cited by examiner

| | | | | | | | | |
|---|---|---|---|---|---|---|---|---|
| A1 | A2 | A3 | | | | | | A9 |
| B1 | | | | | | | | B9 |
| | | C3 | C4 | | | | | C9 |
| | | D3 | D4(x) | D5(x) | | | | D9 |
| | | | E4(x) | E5(x) | | | | E9 |
| | | | | F6(z) | | | | F9 |
| | | | | | | | | |
| | | | | | | | | |
| I1 | I2 | I3 | | | | | | I9 (y) |

Fig. 6

| | | | | | | | | |
|---|---|---|---|---|---|---|---|---|
| A1 | A2 | A3 | | | | | | A9 |
| B1 | | | | | | | | B9 |
| | | C3 | C4 | | | | | C9 |
| | | D3 | D4(x) | D5(x) | | | | D9 |
| | | | E4(x) | E5(y) | | | | E9 |
| | | | F5 | F6(y) | | | | F9 |
| | | | | | | | | |
| | | | | | | | | |
| I1 | I2 | I3 | | | | | | I9 (z) |

Fig. 7

AUTOMATIC DISPENSING MACHINE AND METHOD OF OPERATION

CROSS-REFERENCE TO RELATED APPLICATIONS

This application is a continuation of U.S. application Ser. No. 12/671,084, filed Mar. 15, 2010, which is the national stage application of International Patent Application No. PCT/IB2008/002010, filed Aug. 1, 2008, and published in English as WO 2009/016490 A3 on Feb. 5, 2009, the entire contents of both are incorporated herein by reference and claims priority under 35 U.S.C. 119 to European Patent Application No. 07015097.4, filed Aug. 1, 2007.

BACKGROUND OF THE INVENTION

1. Field of the Invention

The present invention concerns an automatic dispensing machine and the related operating method, in particular an automatic dispensing machine, and its operating method, for distributing edible and/or non-edible goods, especially packaged food such as snacks, sandwiches, beverages in bottles or cans, etc., and/or for preparing and dispensing edible goods, not packaged, such as hot or cold drinks, water, juices, coffee, milk and the like.

2. Background of the Invention

Such dispensing machines are normally arranged to operate at unattended locations, such as those provided within railway stations, airports, public/private offices, hotel reception-halls, etc., and also at attended locations, where trained staff is available to run the machine for serving the customers. The dispensing machines of the aforesaid type may also be provided at "Do-It-Yourself" areas, such as the areas not available to the general public (but only to "internal" public) provided within restaurants, self-serving catering sites, cafeterias or food and grocery stores, to be operated directly by the user. The unpackaged goods may be delivered in paper or plastic cups, as well as in mugs, porcelain cups and similar receptacles available to the customers or provided by the customer.

Traditional dispensing machines intended to be operated directly by the customer may allow payments by cash, for instance coins or banknotes, or may require identification of the user, so as to allow electronic payments. Alternatively dispensing machines may operate in a so-called "free-vend" mode, that is without need of establishing an economic transaction or identification of the user.

Identification is normally accomplished by providing the user with an electronic token, for instance a credit/debit card, a smart card, a RFID tag, an electronic key.

Generally, basic user interfaces are provided with mechanical buttons for actuating micro-switches or electromechanical components of the machine, such as membrane panels. Selections are made by the user pushing the button corresponding to his/her preference. Pressing of the button causes the control unit to operate the machine according to the user's choice. Other simple user interfaces comprise a LCD screen which shows alphanumeric or graphic frames. Usually the frames shown to the user contain information related to the available goods, i.e. advertising related to the kind and quality of goods available, or ancillary instructions or information concerning the state of the machine, but the user has to make the selection by pressing the aforesaid mechanical buttons. Patent application US 2007/0018972 discloses a dispensing machine provided with a visual interface for the user. The interface comprises a screen for displaying attractive information to the user(s), but selections have to be made by means of a traditional button-panel provided with a number of buttons corresponding to available selections. Patent application WO 2004/036509 discloses a beverage dispensing machine provided with a traditional user interface comprising a control panel to be operated by the user. The panel has a screen on which brewing instructions are displayed. Advertising may be shown on the same screen.

Recently, more sophisticated interfaces have been provided to sense movements made by users to input specific commands to the dispensing machine control unit. Such interfaces are optical and provide, for instance, infra-red sensors to detect the user's body position with respect to the areas which can be scanned by the same sensors.

Alternatively, modern user interfaces may have resistive sensors to detect the resistance provided by the user's body. Such resistance triggers the control unit which activates according to a single selection made by the user.

Available dispensing machines are still limited to simple user interfaces or control panels which do not permit customization or a stricter interaction with the user, while the need is felt for more effective solutions which allow for an improved interaction with users and at the same time are versatile so as to meet the expectations of a great number of customers worldwide.

Recently dispensing machines have been provided with graphic-user-interfaces, or GUIs, having touch-screens. The user can make or confirm a selection by pressing a virtual button displayed on the touch-screen. Such virtual buttons simply replicate traditional mechanical buttons without improving effectiveness of the machine. Disadvantageously, such solutions have proved to be expensive, in that touch screens are more expensive and fragile than a traditional button panel. Both capacitive and resistive sensors may operate under the transparent panel of a graphic display, for instance a LCD or a plasma screen, to allow the user to input a specific command using for instance his/her finger and pressing one virtual button. A graphic background is provided to communicate with the user. WO 2007/003990 discloses a similar dispensing machine having a touch-screen providing the required function buttons, including an area where a finger movement sensor is provided to adjust e.g. the amount of sugar.

U.S. Pat. No. 6,759,072 discloses a vending machine provided with a GUI showing predetermined beverage selection icons that correspond to the formulation saved by the user or corresponding to the preferred beverage formulations of the user. Alternatively, the same formulations are shown to every user and are changed according to the time of the day, season, weather and the like.

WO 01/03087 discloses a vending machine of the above mentioned type, in which there is provided a program that displays messages on the display to promote some products rather than other ones, e.g. instead of the product selected by the user, another product is proposed by the machine. This is clearly a good method of annoying the user.

EP 0823696 discloses a vending machine having a display to show the products and wherein the non-available products are not shown on the screen of the display.

Use of sophisticated GUIs, for instance LCD screens and multimedia content including moving images, with dispensing machines is still considered disadvantageous, in that such GUIs are relatively expensive, compared with control panels having traditional simple buttons, such as those described in WO 98/16892, and have not been proven to improve business, i.e. they have not been proved to attract customers and improve selling of goods and products.

Another drawback of known machines is that user interfaces do not take part into the processes of diagnosis carried out by the control unit. An increase in maintenance costs has been recently experienced by the manufacturers and the managers of the dispensing machines, in that the same machines often require recurring technical back-up on the operating site. Particularly, machines for dispensing food and edible goods such as hot or cold beverages require maintenance of some components, for instance because of built-up of food residues which rapidly deteriorate when in contact with air, lime-scale obstructions, limited life-spans, etc. Normally the control unit performs periodical auto-diagnosis routines for checking proper functioning of all the parts of the machine. The user cannot intervene through the related interface.

WO 2007/012949 discloses a process for monitoring operation of a dispensing machine. If malfunctioning or failure of one or more components is detected by the control unit, the user interface is controlled so as to inhibit one or more selections (initially available to the user), i.e. one or more buttons, corresponding to the good which cannot be dispensed.

There is therefore the need to improve the traditional ways of operating dispensing machines even the more recent machines having a graphic user interface display. There is moreover the need for a system to increase the number of functions made available through the dispenser's GUI, at the benefit of its users, wishing to benefit from the additional user friendliness brought by a high definition graphic display. It is further needed a GUI that allows a simple method of programming and storing the several conditions triggering a change in the visual appearance of the GUI to the end user, as the owner of the dispenser may see fit.

It is also needed a method to channel the information of these triggering conditions remotely to the dispenser, as well as to remotely monitor the occurrence of these triggering conditions as received from the dispenser. A further problem in the face of the prior art documents is to provide a system of improving the revenue from a vending machine without jeopardizing the user-friendliness of the same.

SUMMARY OF THE INVENTION

The present invention overcomes the drawbacks of known solutions in a simple and effective way, by providing a dispensing machine having a graphic user interface which allows for an improved interaction with the users, possibly involving the same users in machine diagnostics routines, and for improved management of the goods stored in the machine.

The present invention provides a dispensing machine, and the related operating method, which allow for optimization of the selections and information made available to the users through the graphic interface, depending on the status of the machine or other parameters.

In general, the dispensing machine of the present invention comprises means for dispensing packaged and/or unpackaged goods, in particular at least in part the goods are edible goods/beverages, for instance snacks, sandwiches, meals, packaged food, beverages in bottles or cans, hot or cold drinks, water, juices, coffee, milk and the like. A control unit is provided connected to one or more electrically-activated parts of the machine, having memory means to store and retrieve digital data. The control unit activates the various units/components of the machine according to a software (resident or non resident) and the user's selections. Moreover, the control unit can use sensors to detect the status and monitor the activity of the machine.

The user interface is also used for showing information to the user and for retrieving input commands (selections) from the user to be sent to the control unit.

In one embodiment, the user interface is a graphic user interface, or GUI, comprising a touch-panel cooperating with a graphic screen, or a monitor, capable to display multimedia content, including audio and multimedia content including moving images. According to another embodiment of the invention, the GUI comprises a graphic screen and mechanical buttons located outside the screen, adjacent to it; by pressing the related mechanical button the selection of what is shown on the adjacent area of the screen is made.

At least the position optionally also the content and/or form of the information shown on the screen is dynamically changed by the control unit on the basis of an input of the owner, or the operator, of the machine, or of a machine related parameter.

The present invention also relates to a method for operating the aforesaid dispensing machine.

BRIEF DESCRIPTION OF THE DRAWINGS

The present invention will be described in detail with reference to the following drawings enclosed as non-limiting examples, wherein:

FIGS. 6 and 7 are schematic views of the display of the machine in two configurations according to the invention.

DETAILED DESCRIPTION OF THE INVENTION

Figure 1:
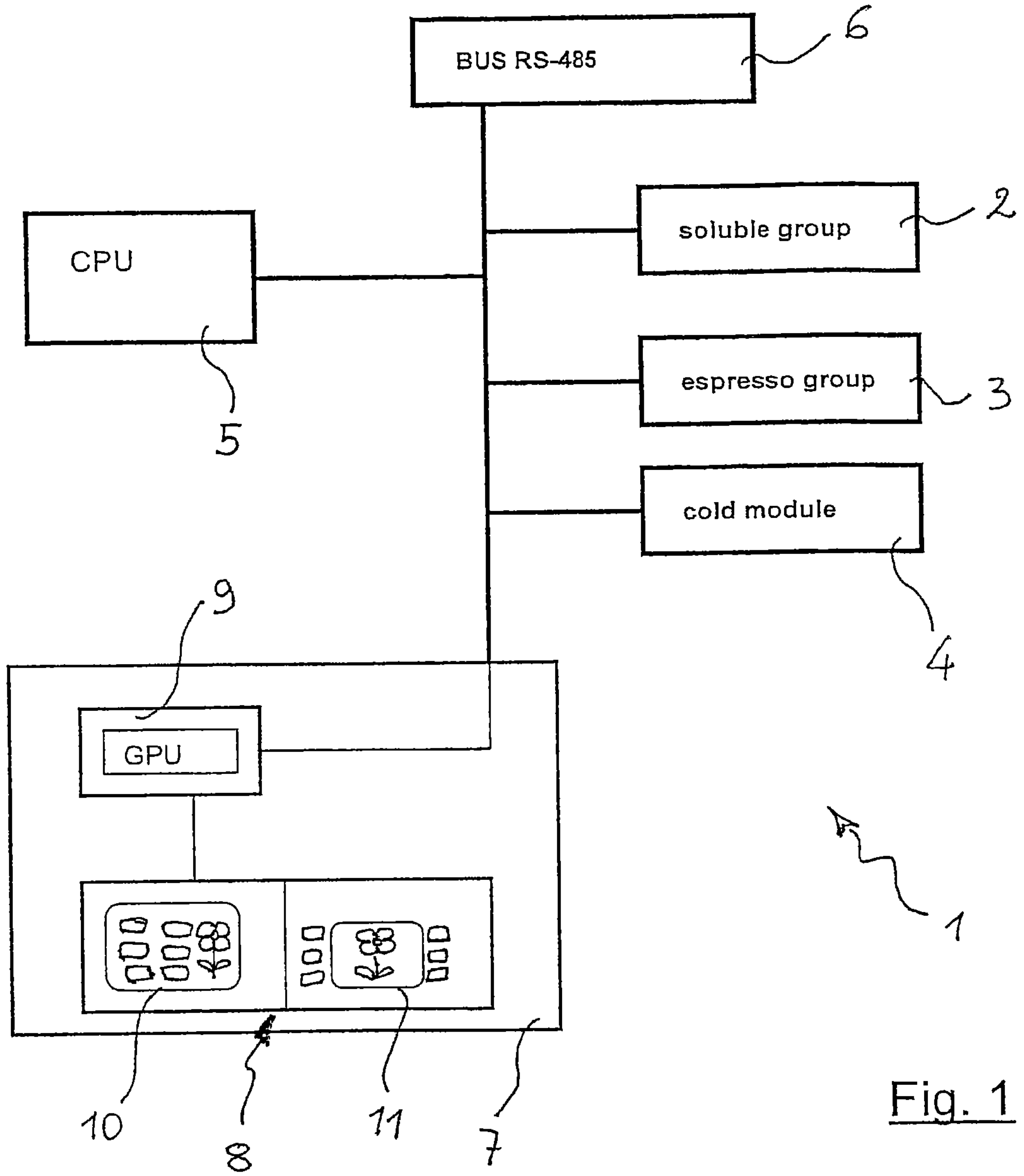
FIG. 1 is a scheme of a dispensing machine according to the present invention.

A method of operating a dispensing machine includes the step of dynamically changing the content and/or form of the information, shown on the screen of the machine, on the basis of an input of the owner, or the operator, of the machine, or of a machine related parameter.

According to the invention, the said at least one "machine related parameter" is preferably including the profitability of the product. The profitability of the product means the economic return of the said product and includes the percent of gain from the sale but also other revenues such as the money the producer of a particular product is willing to pay in order to position the image of his product in a selected portion of the display.

In other words, the icons of the products that are more profitable are positioned in the area of the display that is immediately evident to the user, possibly using a bigger area of the display, while other product icons are positioned in other areas of the display, or may also not be shown at all as an icon but only recalled to the display by pressing a button.

The "machine related parameter" can, in addition or alternative to the profitability, or revenue, of the product, include other parameters. Preferably the parameter includes also the product remaining shelf life, and can in addition include anything that is that directly or indirectly related to the operative status of the machine; examples of machine related parameters are e.g. the geographical location of the dispensing machine (when it is operating), the calendar date and/or the day time, statistics or log data indicative of previous selections made by user(s) (such as frequency of use), the single user profile (e.g. what beverages he can have free and what on payment, or availability of some products: alcohol and cigarettes not sold to minors) or on the basis of the signal provided by at least one sensor of the machine detecting proximity of the user(s), the ambient temperature and the temperature of the machine components (such as the temperature of the cold drink store), ambient humidity, information on the contained products, such as amount and shelf life, namely remaining shelf life, status of the machine components, e.g. failure of a component.

The information displayed through the GUI interface also contains what we are hereinafter calling "virtual buttons" and "virtual shelves"; with the wording "virtual buttons" it is meant every means that comprise an information shown on the GUI display and a button for sending a command to the control unit, said command being related to the shown information. In the most common case, the information relates to the products that can be dispensed by the machine and the command is to dispense said products and/or the type of product: e.g. the button shows information on espresso coffee and amount of sugar in the coffee.

The shown information and the button can coincide, i.e. the virtual button is the area of the screen that is used to display a command button, that the user presses or touches for allowing the user to make or confirm a selection. Alternatively, the screen is not a touch screen and, as previously mentioned, the virtual button will comprise the same "object" or information shown on the touch screen and a real button located outside the screen for imparting the command shown in the screen; this type of virtual buttons is used in some ATM for cash dispensing.

The present invention provides that at least the position, possibly also the number and/or the content and/or the aspect (dimensions, colors, background, patterns, etc.) of said virtual buttons is changed upon analyzing said parameter, by the control unit or depending on previous selections made by the owner of the machine. In other words, at least the position and possibly also the space and aspect available for the virtual buttons on the screen of the GUI interface is always optimized with respect to available choices and other information deriving from the said at least one parameter.

This means that the virtual buttons corresponding to the products on sale are positioned in one portion of the display rather than in another portion, depending on the parameter, preferably the profitability or the shelf life. Ideally, buttons corresponding to the products having reduced shelf life will be positioned in an outstanding position of the display to improve their sale and maintain profitability (avoiding losses after the expiry date of the products.

The content and form of the displayed information is adapted to the operating status of the machine. For instance, if a module or component of the machine is not operative, because of failure, shortage of some ingredients, end of expected shelf-life, etc., the control unit correspondingly changes the virtual buttons, e.g. by removing the buttons that are normally used to operate the failed component or by moving them to a "sorry-not-available section of the display, or by altering the button to show that the corresponding product it is not available. Additionally the control unit can give notice to the user by displaying a corresponding information on the screen/monitor: in the case of shelf life of the products, such information can be a "sale advertisement" i.e. a way of promoting the sale of the said products before the shelf-life has expired, e.g. by reducing the price of said products.

As the graphic user interface GUI allows for multimedia content to be displayed, the content of the information can change dynamically, i.e. can comprise movies, pictures, animations, etc. Number, aspect, position and content of virtual buttons are adapted by the control unit to fit the space available on the screen of the machine, without negatively affecting other information to be displayed. In an embodiment, the virtual buttons are part of a more complex image on display. The content and form of the displayed information, other than virtual buttons for allowing selections, may also relate to the geographical location of the machine. For instance, the machine is provided with a means of localizing the machine (e.g. a GPS module, i.e. a global positioning system for detecting geographical location, or a link via Internet or Ethernet) which communicates to the control unit where the machine is located. The control unit is, in this example, provided with data concerning statistical information on preferences of the users with respect to their location. The control unit changes the form and the content of the information displayed on the GUI on the basis of the statistic data which are deemed to be the most relevant for the users of the determined location. Alternatively, such statistical data may be stored into an electronic key available to the user or to the owner/manager of the machine.

The dispensing machine of the present invention may also be provided with a proximity sensor capable of detecting presence of a person in the surroundings of the machine, for instance next to the front panel of the machine. The sensor sends a signal to the control unit, which may change the form and content of the displayed information. For example, when no person is in the nearby of the machine, the control unit sets the machine into a stand-by mode, for instance a low energy consumption mode wherein the GUI is turned off. Upon receiving such signal, the control unit turns on the GUI, i.e. sets the machine into an operating vend-mode, and displays information which may draw the attention of the person whose presence is detected.

The touch-panel comprises resistive or capacitive sensors to detect pressure exerted by the user with fingers for confirming a selection corresponding to a virtual button displayed onto the screen. When the form and/or the content of the information displayed on the screen changes, for instance because new virtual buttons or selectable images are displayed, the touch-panel allows the user to make selections over new images, buttons, etc.

Preferably, the graphic screen is a LCD monitor, or a plasma monitor, having minimum resolution of 320×1024 pixels, a preferred resolution being 768×1024 pixels.

Additionally, the information displayed through the GUI can also relate to parameters which are indicative of the operative status of the machine. As previously mentioned, such parameters are related to the fault-condition or the remaining life-span of a component/part/module of the machine, the available quantity of goods/ingredients/water, the temperature of a good to be dispensed, the temperature of the site where the machine is located, the granulometry of an ingredient, the pressure and/or the temperature of the water to be used for preparing a beverage. The information displayed on the screen may also be related to the details of the selection made by the user, the time-remaining to the completion of the vend, the number and type of available selections, nutritional information of the goods, prices of available goods/products, promotional advertising on available selections, etc.

Other type of information may be displayed, for instance weather forecasts, news update and advertisements which are not strictly related to the operation of the dispensing machine.

Preferably the machine, for instance its control unit, is connected, directly or wireless, to a remote managing server for exchanging information about the operation of the machine itself or for acquiring statistics about the vends.

Advantageously, the dispensing machine of the present invention and the related method for operating the same allow for optimization of the interaction between the machine and the user(s). The information shown on the GUI interface are dynamically changed on the basis of the actual status of the machine, statistical data concerning the vends, location of the machine, etc. Virtual buttons are displayed on the GUI screen to allow the user to make/confirm selections by pressing the same. The touch-panel cooperating with the screens transmits to the control unit an electric signal indicative of the virtual button pressed by the user.

Advantageously, the space available on the screen is dynamically changed by the control unit by adapting at least the position, but also the number, the content and the aspect of the virtual buttons to meet the needs of the moment or to improve sales.

By re-programming at least the position and possibly one of the number, the content, and the aspect of the virtual buttons, the control unit may display virtual menus. In this way the display of the dispensing machine will operate as a "virtual shelf for vending goods, a shelf that is dynamically changed by the owner or operator of the machine through instructions set or sent to the control unit to modify the way the machines operates, especially with respect to the user (consumer). In other words, the GUI is used by the control unit as a programmable visual sales area where the goods "on the shelf, i.e. displayed, in the morning are differently located from the goods "on the shelf in the afternoon, in a way similar e.g. to the display in a bar where in the morning croissant and sweet snacks suitable for coffee are found and where in the evening olives, chips and salty snacks suitable for chilled drinks are on display.

Moreover, the invention allows for an improved interaction user-machine, in particular in case of malfunctioning or when technical assistance is recommended. For instance, when a module of the dispensing machine is not operating, because a shortage of a certain ingredient is occurring or because of a fault, the control unit may create new virtual buttons for the user to help in carrying out a diagnostic procedure over the machine. In other words, the virtual menu guides the user through a diagnosis procedure which may help the control unit to detect what the problem/fault is, thereby allowing for an effective feedback.

Other information, which is not strictly related to the operation of the machine, such as news update, broadcasted TV channels, weather forecast or commercial advertising, may be displayed on the screen of the GUI interface. At a given moment in time, images, videos, pictures, writes or the like, can be displayed which are deemed to effectively attract the user(s) to purchase a good/beverage.

For instance, the information shown on the GUI interface screen may change in dependence of the time. In the morning, around breakfast time, or during winter or when room temperature is below a preset value, the GUI displays images, videos or pictures related to beverages such as hot coffee, white coffee, chocolate, hot tea, or the like. In the afternoon, around lunch time, or during summer time or when room temperature is higher than a preset value, the GUI shows images of cold beverages, such as sparkling water, juices, soda pops, colas and the like.

With reference to FIG. 1, it is shown a machine 1 according to the present invention for dispensing beverages; the machine 1 therefore comprises in a way known per se a soluble group 2, an espresso group 3 and a cold module 4 for cold beverages. The three modules are connected with a CPU 5 by means of a BUS 6, e.g. a BUS RS-485, the CPU acting a control unit for operation of the groups and modules.

The machine of the present invention also comprises a peripheral module 7 that comprises a Graphic User Interface (GUI) 8 that is connected to BUS 6 and has a graphic screen capable to display at least part of virtual buttons to operate the machine and multimedia content. In the embodiment of FIG. 1, a Graphic Processing Unit 9 is provided to process the multimedia content and the virtual buttons on the display; a suitable GPU will have a 200 MHz clock, a 32 Mb RAM and a 32 Mb Flash and the CPU of the machine will therefore be substantially a standard one as normally used in known dispensing machine e.g. with a 1 MHz clock, 2 Kb RAM and 64 Kb Flash.

FIG. 1 shows two possible types of GUI. On the left side of GUI 8, a touch panel screen 10 is shown; in this embodiment, the virtual buttons are totally located on the screen, i.e. the display, and are generated and modified by GPU 9 in the way above disclosed, i.e. on the basis of a control unit command and/or detection of a machine related parameter.

The other type of GUI that can be used in the present invention is shown on the right side of element 8 and is, as previously discussed, formed by a screen 11 and a plurality of traditional buttons 12 (i.e. buttons that are "mechanical") located on the side of the screen 11. The indication, or information, corresponding to the button is shown on the screen 11 and can be selected by pressing the adjacent button.

Figure 1A:
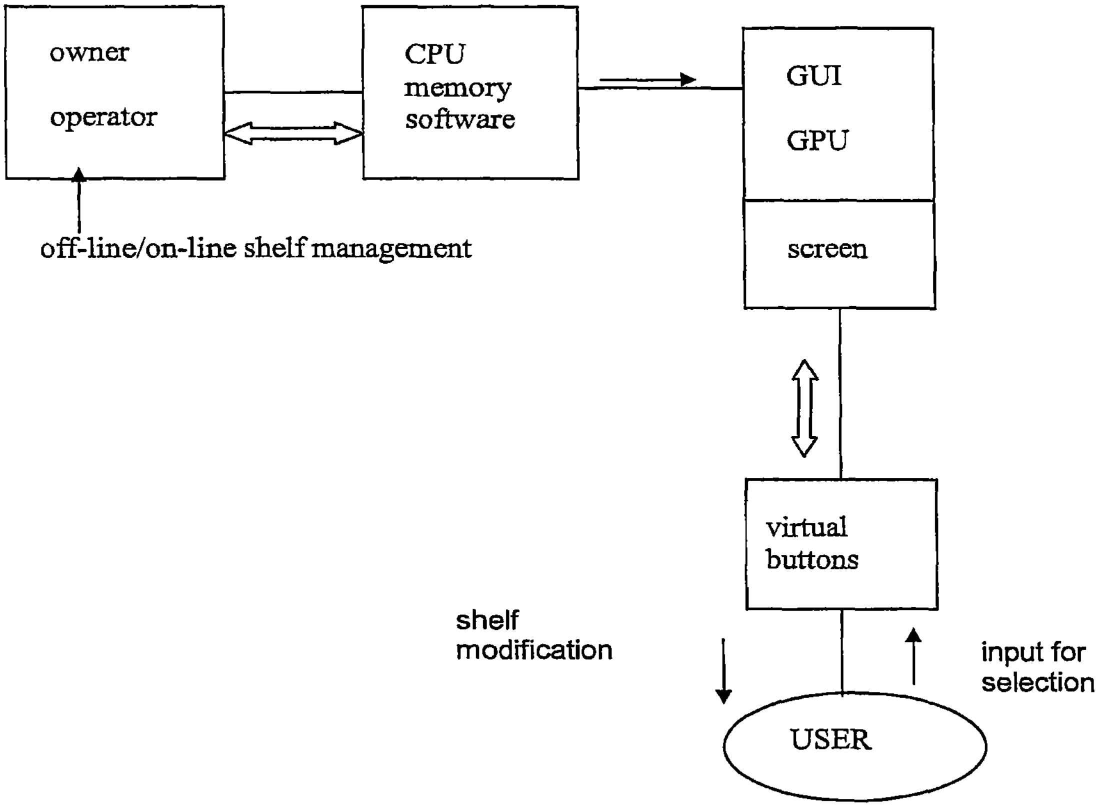
FIGS. 1A and 1B are block diagrams showing in greater detail the machine of FIG. 1.
Figure 1B:
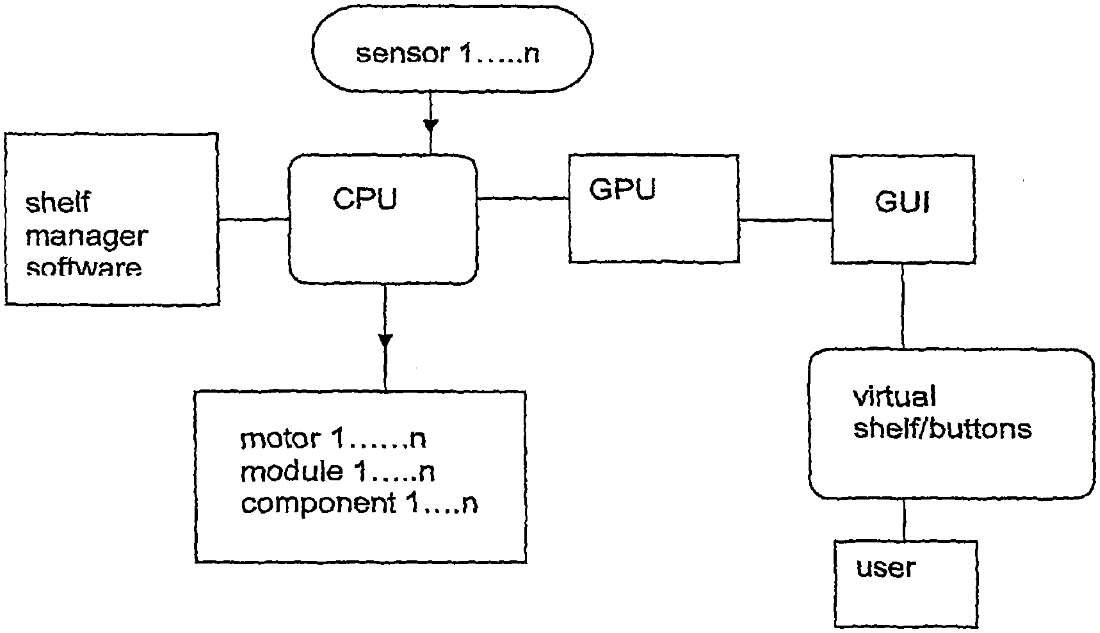

FIG. 1A and FIG. 1B are two block diagrams showing the "virtual shelf management that can be obtained by the present invention, that provides to control the "virtual buttons" through a control unit, that preferably is a CPU and/or GPU, by changing or altering the virtual buttons on the basis of a command of the control unit and/or of one or more parameters related to the dispensing machine.

Figure 2:
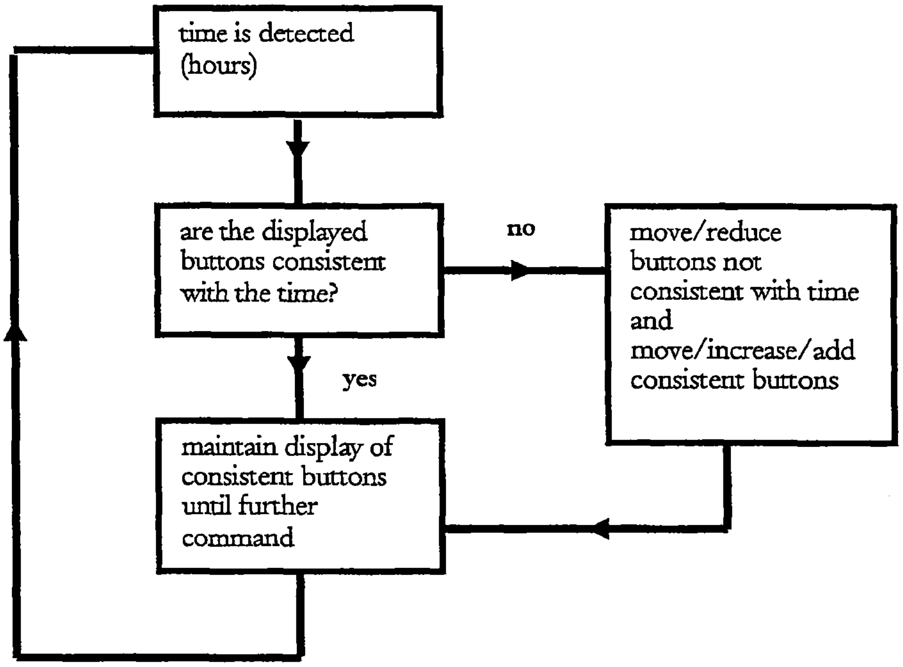
FIGS. 2-5 are block diagrams of machine operation procedures according to the present invention.

In FIG. 1 it is highlighted the virtual shelf management carried out by the owner or operator of the machine, either off-line or on-line, e.g. in response to statistical data provided by the control unit. The "shelf, i.e. what is shown on the GUI screen, including virtual buttons, can be changed not only by the user, through inputs for choice or screen modification in a known way, but also by the owner and/or the operator of the machine, while the machine is operational. In FIG. 2 it is highlighted the shelf management through sensors (1 . . . n) that sent corresponding signals to the control unit that changes the virtual shelf according to the data received by the sensors. As an additional advantage, the control unit can use the data received from the sensors to modify, besides the virtual shelf, also the operation of motors, modules and similar components of the machine.

As above mentioned, the invention provides for changing the position of the virtual buttons and the virtual buttons preferably show all the products available from the vending machine. Thus, in a preferred embodiment, the display acts as a window panel showing the products, the position of each product available from the machine being selected according to the machine related parameter, namely the profitability.

FIGS. 6 and 7 exemplify the method of the invention.

In FIG. 6 it is shown a display configuration where there are provided 9×9 virtual buttons on a touch screen GUI. The buttons are identified as A1, A2, . . . 18, 19 and each button corresponds to one product; it is possible to have more than one button identifying the same product, e.g. product x is identified by buttons D4, D5, E4, E5. According to the invention, the position of the buttons A1, A2, . . . 18, 19 is selected according to the profitability, as defined above, so that most profitable product x is positioned at the most outstanding buttons, or the buttons immediately visible to the user, e.g. D4, D5, E4, E5. It should be noticed that the screen area for buttons D4, D5, E4, E5 can bigger than the for the other products. Less profitable product y is located at button 19 at the bottom right corner of the GUI.

If the product x becomes less profitable, e.g. the manufacturer is no longer willing to pay the rent of the outstanding buttons D4, D5, E4, E5, product x can be moved to another location of the display.

In FIG. 7 it is shown the result of the scenario discussed hereinbelow with reference to FIG. 4, in which product y was detected to be close to the expiry of its shelf life. In this case, the control unit of the machine (CPU) is informed by the tag present on the product of the expiry date and therefore provides to move product y from the small button 19 to button F6, previously corresponding to product z; button 19 will then identify product z until further command from the CPU.

Thus, the preferred invention embodiment provides for the following steps: providing a plurality of virtual buttons on a GUI touch-screen display; assigning at least one button to each product available from the machine, said buttons being assigned to the corresponding product according to at least one machine related parameter that includes the profitability of the product and the position of the button; changing the position of the product by assigning the product to another button, i.e. to another position, according to said parameters when necessary or required.

Visually, each product is preferably identified by an icon. When the product is assigned to another button, the position of the icon identifying the product y will be moved from the initial position, e.g. F6, to final (but temporary) position I9. Thus, the button/icon for product z will be "moved" from the initial position to another position. The same occurs for product y.

Possible scenarios of the above mentioned ways of operating a vending machine according to the invention, are hereinafter discussed with reference to FIGS. 2-5.

With reference to FIG. 2, there is shown a method of operating the machine according to the present invention in which the machine related parameter is the time of the day. According to this embodiment, the control unit detects the time of the day, i.e. it establishes if it is morning or afternoon or evening etc. Once the time is detected, the control unit will check what goods are "on the shelf" i.e. on the display and will determine if the goods on the shelf are consistent with the detected time, i.e. if they are suitable for the morning or evening etc. It is also checked if the position of the products is consistent with their "profitability" parameter and with the shelf-life/expiry date parameter. The information on the product shelf-life is preferably obtained by the CPU from a tag or RFID located on the product as disclosed in WO 2006/016241 and U.S. 2008/0116262 A1 published 22 May 2008, which is incorporated herein by reference in its entirety.

As previously mentioned, the goods "on the shelf (i.e. the relevant images or information displayed by the GUI) in the morning are different from the goods "on the shelf in the afternoon. Thus, if the time detected is e.g. a morning hour (or any other time, e.g. late night, according to the owner/operator instructions to the control unit), the control unit will check if croissants, biscuits and sweet snacks, coffee and breakfast goods and beverages in general are on display on the GUI and if the area of the screen dedicated to these goods is big enough. This means checking if the virtual buttons are there in the form required; additionally, multimedia contents are displayed on the GUI, as per the instructions set with the software.

If the answer is YES, the virtual buttons are maintained in the form in which they were found until a further different command is received. This means that the dispensing machine will be able to dispense said goods by a direct command of the user who pushes one or more of the displayed buttons on the GUI, and that the buttons for salty snacks are not displayed at all and can be reached only through a series of commands. If the answer is NO, e.g. because the GUI is showing an "evening menu" with e.g. olives, chips and salty snacks only, the control unit will modify the buttons and the multimedia contents on the display to make them consistent with the detected time of the day, as above discussed.

Thus, the control unit imparts a command by which the operation of the dispensing machine is modified with respect to the previous condition (dispensing of salty snacks), because salty snacks cannot be dispensed at all or can be dispensed only if the user opens a menu showing the relevant push buttons, this condition is then maintained until a further command is received by the control unit.

Figure 3:
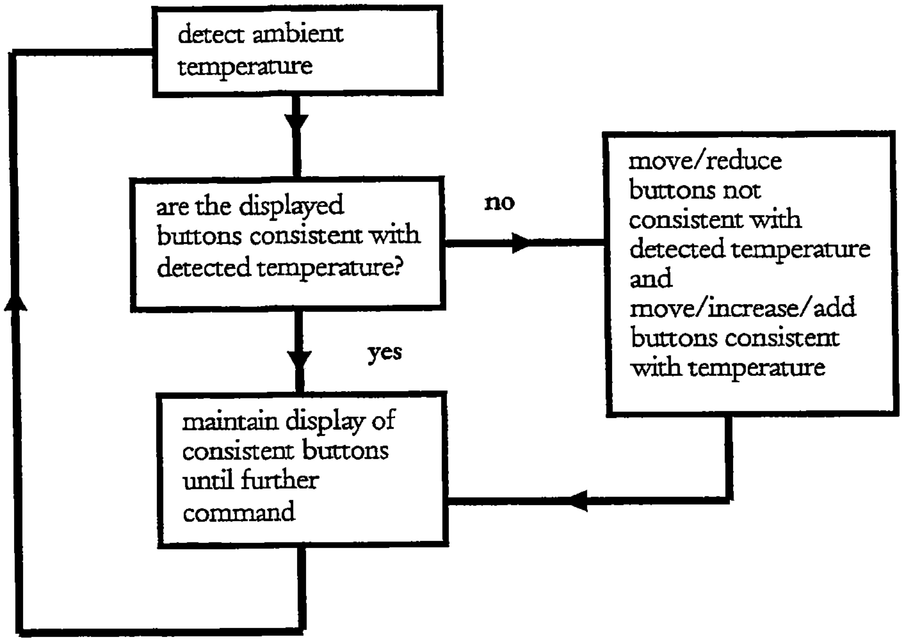

The block diagram of FIG. 3 shows a similar way of controlling and modifying the operation of the dispensing machine, wherein the machine related parameter is the ambient temperature. According to this controlling procedure, the control unit will check if the virtual shelf, i.e. the buttons (and multi media content) on display on the GUI are consistent, i.e. suitable, with the detected temperature. As an example, the area, form and number of buttons for dispensing cold beverages should be e.g. 90% of the total area of the display.

If, upon detection of the temperature and checking the buttons/multimedia content on the display, the answer is YES, the checked display is maintained in said condition until a further command is given by the control unit.

If the answer is NO, the display is modified as required, by increasing the number of suitable buttons and, if required, by adding new buttons, such as e.g. a button for "cold coffee". Then, the modified display is maintained in the new mode or condition until a further command is imparted by the control unit.

Figure 4:
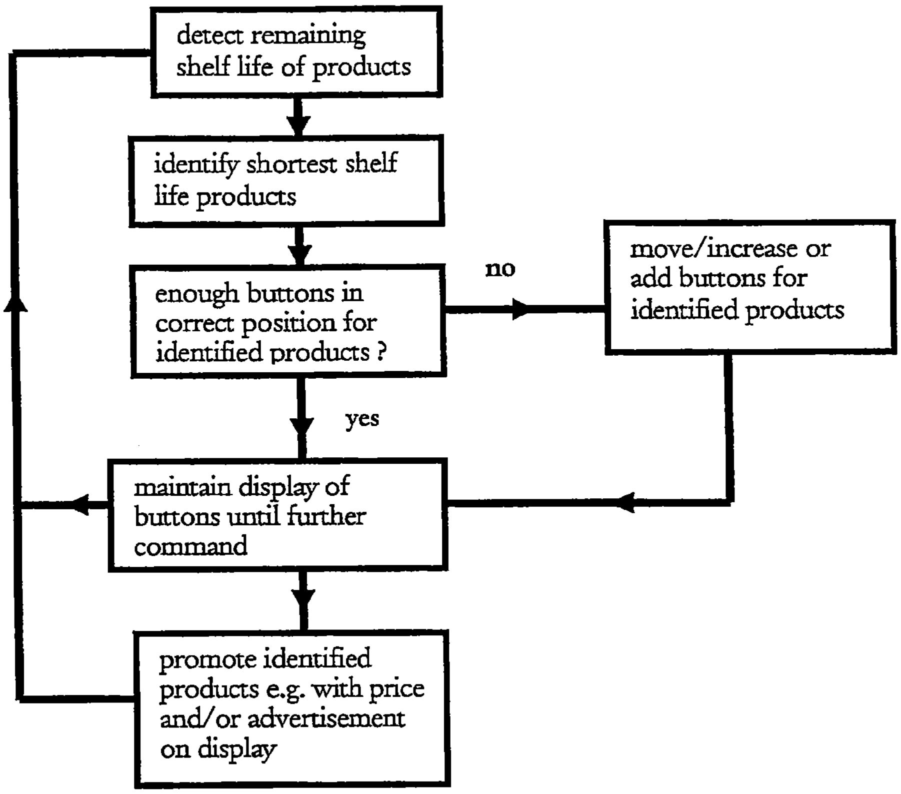

In FIG. 4 a block diagram of a further procedure of modifying the operation mode of the dispensing machine is shown. In this embodiment of the invention the machine related parameter is the remaining shelf life of a product (or more than one).

Initially, the control unit will detect the remaining shelf life of the perishable products stored in the dispensing machine. This detection can be carried out in any known way, e.g. by providing the products with identification means such as a RFID or a tag. A way of carrying out such an identification is disclosed in WO 2006/016241 and U.S. 2008/0116262 A1 published 22 May 2008, that is incorporated herein by reference in its entirety.

After the product(s) with the shortest life is or are identified, the control unit will modify the operation of the dispensing machine to promote the sales of the identified product or products before the shelf life has expired. In order to do this, the control unit will check if there are enough buttons for the identified products and if their position is the appropriate outstanding one for improving sales. If the answer is YES the display is maintained in said configuration until further command; if the answer is NO, buttons for the identified product (s) are moved or increased in size or new buttons are added. Multi media contents are also possibly shown on the GUI to promote the sales of the expiring products.

Figure 5:
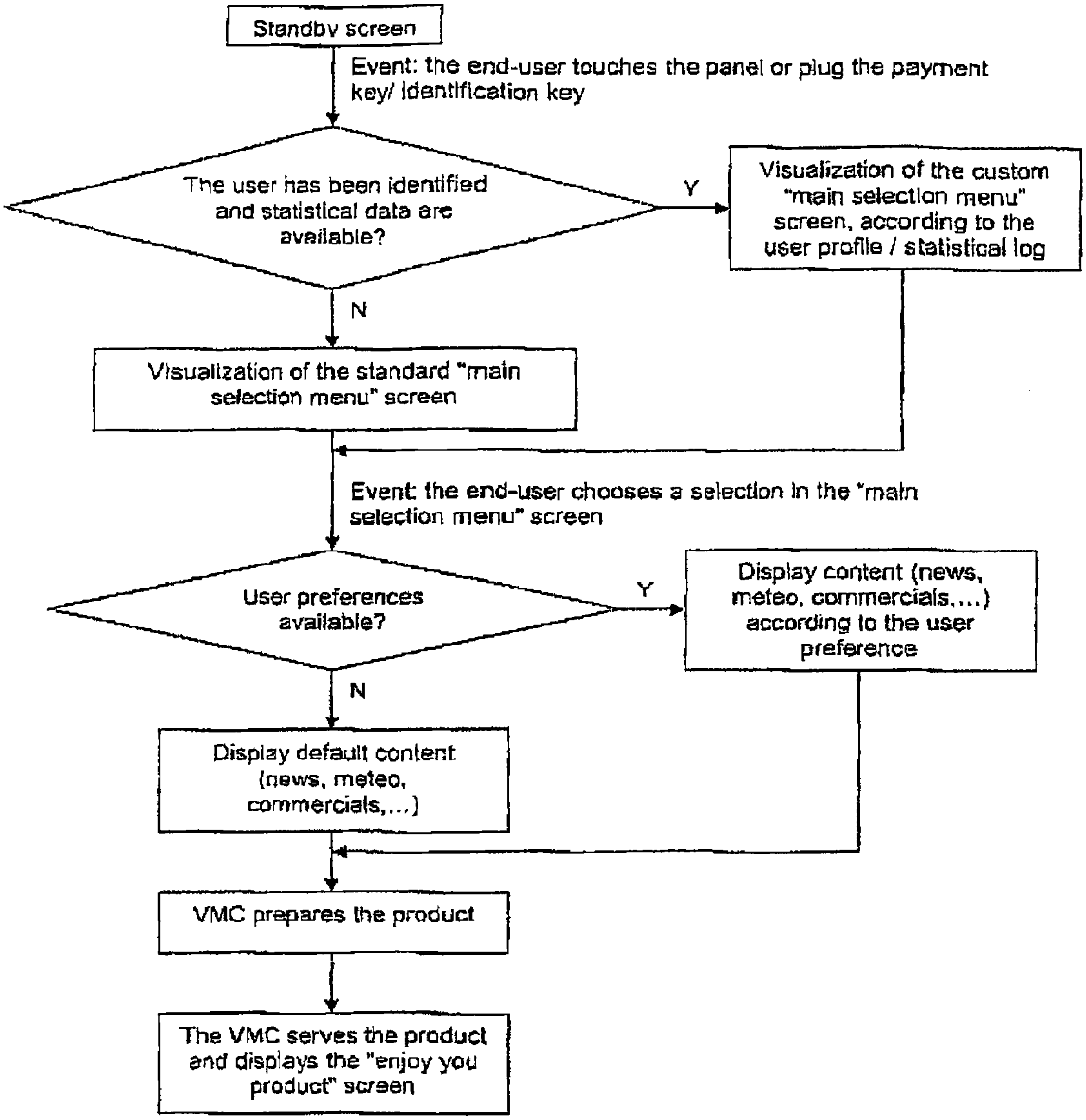

Flow chart shown in FIG. 5 discloses a further procedure wherein the parameter is the user profile or a statistical log of the same.

As shown, if the user is identified, the GUI will display a main selection menu screen according to the user profile or to the statistical log of the selections previously made by the user. The same "user oriented" approach is followed while the dispensing machine is preparing the product (e.g. a hot beverage) to be dispensed. If the user has not been identified, a default display is used.

The invention claimed is:

1. A dispensing machine, comprising:

a control unit connected to one or more electrically-activated parts of the machine, the control unit including a memory to store and retrieve digital data; and means for showing information to an user and for retrieving input commands from the user to be sent to the control unit, said means for showing and retrieving including a graphic user interface (GUI) comprising a graphic screen configured to display at least part of virtual buttons to operate said machine and to display multimedia content, wherein the control unit is configured to change at least one of the virtual buttons on the graphic screen in response to a control unit command depending on a machine related parameter obtained by the control unit, the change including increasing a size of the at least one of the virtual buttons with respect to at least another one of the virtual buttons present on the graphic screen, and wherein said machine related parameter is product profitability or product shelf-life of a product corresponding to the at least one of the virtual buttons to be increased in size.

2. The dispensing machine according to claim 1, wherein said GUI includes a touch-panel comprising sensors to detect pressure exerted by the user and the graphic screen is an LCD monitor or a plasma monitor.

3. The dispensing machine according to claim 1, wherein in addition to product profitability or product shelf-life, said machine related parameter includes one or more of a fault-condition or a remaining life-span of a component, part, or module of the machine, an available quantity of goods, ingredients, or water, a temperature of a good to be dispensed, a temperature of a site where the machine is located, a granulometry of an ingredient of a product stored in the machine, and a pressure or temperature of water to be used for preparing a beverage.

4. The dispensing machine according to claim 1, further comprising a user-recognition device and a device configured to alter said virtual buttons and multimedia content according to commands from said user-recognition device.

5. The dispensing machine according to claim 1, further comprising an information unit configured to inform said control unit of a status of goods to be sold and a status of components of the machine.

6. The dispensing machine according to claim 5, wherein said information unit includes tags or RFIDS.

7. The dispensing machine according to claim 1, wherein said multimedia content comprises weather forecasts, news updates, or advertisements.

8. The dispensing machine according to claim 1, wherein said multimedia content comprises a profile of a selection made by the user, time remaining to completion of a vend, a number and type of available selections, or prices of available goods, products, or promotional advertising on available selections.

9. The dispensing machine according to claim 1, wherein said control unit is connected to a remote managing server.

10. The dispensing machine according to claim 1, wherein the at least another one of the virtual buttons does not meet the machine related parameter.

11. The dispensing machine according to claim 1, wherein when the control unit increases the size of the at least one of the virtual button with respect to at least another one of the virtual buttons present on the graphic screen, the virtual buttons are adapted to fit in available space of the graphic screen without negatively affecting the multimedia content being displayed on the graphic screen.

12. The dispensing machine according to claim 1, wherein the control unit is further configured to change at least one of the virtual buttons in response to an input of a user, owner, or operator, the change including altering a position of the at least one of the virtual buttons to a central location on the graphic screen or increasing a size of the at least one of the virtual buttons with respect to at least another one of the virtual buttons present on the graphic screen.

13. The dispensing machine according to claim 12, wherein when the control unit changes the at least one virtual buttons in response to the input of the user, owner, or operator, the virtual buttons are adapted to fit in available space of the graphic screen without negatively affecting the multimedia content being displayed on the graphic screen.

14. A non-transitory computer readable medium operating a dispensing machine program for a dispensing machine that, when executed by a computer, causes the computer to execute:

storing and retrieving digital data by a control unit of the dispensing machine;

displaying, via a graphic screen of a graphic user interface (GUI), information including virtual buttons to operate said machine and multimedia content including moving images;

retrieving input commands from a user via the graphic screen; and changing at least one of said virtual buttons in response to a control unit command depending on a machine related parameter obtained by the control unit, and the changing includes increasing a size of the at least one of said virtual buttons with respect to at least another one of said virtual buttons present on the graphic screen, wherein said machine related parameter is product profitability or product shelf-life of a product corresponding to the at least one of the virtual buttons to be increased in size.

15. The medium according to claim 14, wherein in addition to product profitability or product shelf-life, said machine related parameter includes one or more of a geographical location of the machine, a calendar date, a day time, statistics or log data indicative of previous selections made by at least one user, a signal provided by at least one sensor of the machine that detects proximity of the at least one user, an ambient temperature, a temperature of components of the machine, ambient humidity, information on products contained in the machine, status of the machine components, a fault-condition or a remaining life-span of a component, part, or module of the machine, an available quantity of goods, ingredients, or water, a temperature of a good to be dispensed, a temperature of a site where the machine is located, a granulometry of an ingredient of one of the products, a pressure or a temperature of water to be used for preparing a beverage, a profile of the selection made by the user, time remaining to a completion of a vend, a number and type of available selections, and prices of available goods or products.

16. The medium according to claim 14, wherein a form or content of said information dynamically changes during a time frame wherein the user is allowed to make selections through the GUI.

17. The medium of claim 14, wherein at least information on said shelf-life of the product is obtained from a tag or RFID provided on said product.

18. The medium according to claim 14, wherein the at least another one of said virtual buttons does not meet the one or more machine related parameter.

19. A dispensing machine, comprising:

a control unit connected to one or more electrically-activated parts of the machine, the control unit including a memory to store and retrieve digital data; and a user interface configured to show information to an user and to retrieve input commands from the user to be sent to the control unit, said user interface being a graphic user interface (GUI) comprising a graphic screen configured to display at least part of virtual buttons or selectable images to operate said machine, and products on sale by the machine being shown by said virtual buttons or selectable images so that the GUI acts as a virtual shelf showing the products, wherein a part of the interface is configured to show multimedia content and any one of number, aspect, position and content of virtual buttons are adapted by the control unit to fit space available on said interface, wherein the control unit is configured to change at least one of said virtual buttons on the graphic screen in response to a control unit command depending on a machine related parameter obtained by the control unit the change including increasing a size of the at least one of said virtual buttons with respect to at least another one of said virtual buttons present on the graphic screen, and wherein said machine related parameter is product profitability or product shelf-life of a product corresponding to the at least one of the virtual buttons to be increased in size.

20. The dispensing machine according to claim 19, further wherein the number, aspect, position and content of virtual buttons are adapted by the control unit to fit space available on said interface without negatively affecting other multimedia information to be displayed.

21. A dispensing machine, comprising:

a control unit connected to one or more electrically-activated parts of the machine, the control unit including a memory to store and retrieve digital data; and a user interface configured to show information to an user and to retrieve input commands from the user to be sent to the control unit, said user interface being a graphic user interface (GUI) comprising a graphic screen configured to display at least part of virtual buttons or selectable images to operate said machine, products on sale by the machine being shown by said virtual buttons or selectable images so that the GUI acts as a virtual shelf showing the products and a number, content, aspect, or position of said virtual buttons or selectable images is changed by the control unit or a previous selections made by an owner or operator of the machine, wherein the control unit is configured to change at least one of said virtual buttons on the graphic screen in response to a control unit command depending on a machine related parameter obtained by the control unit, the change including increasing a size of the at least one of said virtual buttons with respect to at least another one of said virtual buttons present on the graphic screen, and wherein said machine related parameter is product profitability or product shelf-life of a product corresponding to the at least one of the virtual buttons to be increased in size.

22. The dispensing machine according to claim 21, where said GUI is configured to display multimedia content.

* * * * *